United States Patent
Woo (10) Patent No.: US 10,474,378 B2
(45) Date of Patent: Nov. 12, 2019

(54) MEMORY SYSTEM AND OPERATING METHOD THEREOF

(71) Applicant: SK hynix Inc., Gyeonggi-do (KR)

(72) Inventor: Chan-Jong Woo, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 80 days.

(21) Appl. No.: 15/670,087

(22) Filed: Aug. 7, 2017

(65) Prior Publication Data

US 2018/0181325 A1 Jun. 28, 2018

(30) Foreign Application Priority Data

Dec. 26, 2016 (KR) .................. 10-2016-0179321

(51) Int. Cl.
*G06F 3/06* (2006.01)
*G06F 13/42* (2006.01)
*G06F 13/40* (2006.01)

(52) U.S. Cl.
CPC ............ *G06F 3/0619* (2013.01); *G06F 3/065* (2013.01); *G06F 3/0688* (2013.01); *G06F 13/4068* (2013.01); *G06F 13/4282* (2013.01)

(58) Field of Classification Search
CPC ...... G06F 3/0619; G06F 3/065; G06F 3/0688; G06F 13/4068; G06F 13/4282
See application file for complete search history.

(56) References Cited

U.S. PATENT DOCUMENTS

| | | | |
|---|---|---|---|
| 7,752,490 B2 | 7/2010 | Abe | |
| 8,880,790 B2* | 11/2014 | Haywood | G06F 13/00 711/104 |
| 2010/0182855 A1* | 7/2010 | Koshizuka | G11C 7/1051 365/193 |
| 2011/0231687 A1* | 9/2011 | Takeyama | G06F 11/1441 713/324 |

* cited by examiner

*Primary Examiner* — Eric Cardwell
(74) *Attorney, Agent, or Firm* — IP & T Group LLP (57) ABSTRACT

A memory system includes a memory controller; a first memory module, the first memory module including first volatile memory devices; a second memory module, the second memory module including nonvolatile memory devices; a data bus for transmitting data between the memory controller and the first memory module and between the memory controller and the second memory module; a first control bus for transmitting first control signals between the memory controller and the first memory module and between the memory controller and the second memory module; a second control bus for transmitting second control signals between the memory controller and the first memory module; and a third control bus for transmitting third control signals between the memory controller and the second memory module, wherein, in a backup operation, the second control bus and the third control bus are electrically coupled.

20 Claims, 4 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0179321, filed on Dec. 26, 2016, in the Korean Intellectual Property Office, the disclosure of which is incorporated herein by reference in its entirety.

TECHNICAL FIELD

This patent document relates to a memory system and an operating method thereof.

DISCUSSION OF THE RELATED ART

Generally, data processing systems such as personal computers (PC), workstations, server computers and communication systems employing a memory module having a plurality of memory chips mounted on a module board are widely used as data storage devices or memory system.

Typically, the memory chips mounted in memory modules which are used in data processing systems are volatile memories, for example, dynamic random access memories (DRAMs). While volatile memories may operate at a high speed, they have a disadvantage in that data are lost if power is not supplied. Recently, in order to cope with such a disadvantage, a memory module of a nonvolatile dual in-line memory module (NVDIMM) type has been disclosed in the art. The NVDIMM is a memory module in which a nonvolatile memory is mounted together with a volatile memory and which prevents data from being lost, through an operation of backing up the data of the volatile memory to the nonvolatile memory as occasion demands. However, such systems are generally expensive to implement.

SUMMARY

The present invention provides a memory system including a plurality of memory modules. At least one of the memory modules may perform backup and recovery operations of data stored therein. The memory system may also be capable of performing backup and recovery operations on data between the different memory modules therein.

In an embodiment, a memory system may include: a memory controller; a first memory module suitable for operating under control of the memory controller, the first memory module including one or more first volatile memory devices; a second memory module suitable for operating under control of the memory controller, the second memory module including one or more nonvolatile memory devices; a data bus suitable for transmitting data between the memory controller and the first memory module and between the memory controller and the second memory module; a first control bus suitable for transmitting first control signals between the memory controller and the first memory module and between the memory controller and the second memory module; a second control bus suitable for transmitting second control signals between the memory controller and the first memory module; and a third control bus suitable for transmitting third control signals between the memory controller and the second memory module, wherein, in a backup operation for backing up data of the one or more first volatile memory devices to the one or more nonvolatile memory devices, the second control bus and the third control bus are electrically coupled.

In a recovery operation for recovering the data backed up in the one or more nonvolatile memory devices to the one or more first volatile memory devices, the second control bus and the third control bus are electrically coupled.

In the backup operation and the recovery operation, the memory controller electrically couples the second control bus to the third control bus.

In the backup operation and the recovery operation, the second memory module transmits a request to electrically couple the second control bus to the third control bus, to the memory controller through a system management bus (SMB).

The second memory module may further include a module controller, and, in the backup operation, the module controller may control the first memory module such that data are read from the one or more first volatile memory devices, and controls the second memory module such that the read data are written in the one or more nonvolatile memory devices.

In the backup operation, the module controller may control the first memory module by using the first control bus and the third control bus which is electrically coupled to the second control bus, and, in the backup operation, data read from the first memory module may be transferred to the second memory module through the data bus.

The second memory module may further Include one or more second volatile memory devices, and, in the backup operation, data of the one or more second volatile memory devices may be backed up to the one or more nonvolatile memory devices.

The first control signals may include an active signal, a column address strobe signal, a row address strobe signal and address signals for the first memory module and the second memory module.

The second control signals may include a chip select signal, a clock enable signal, an on-die termination signal and a clock signal for the first memory module.

The third control signals may Include a chip select signal, a clock enable signal, an on-die termination signal and a clock signal for the second memory module.

The memory system may further include a switch array suitable for electrically coupling the second control bus to the third control bus in the backup operation.

The switch array may electrically decouple the second control bus and the third control bus from the memory controller when electrically coupling the second control bus and the third control bus.

The memory system may further include an emergency power source suitable for supplying power to the first memory module and the second memory module in the backup operation by a power failure of a host.

In an embodiment, an operating method of a memory system may include: providing the memory system including a memory controller, a first memory module, a second memory module, a data bus which is shared by the first memory module and the second memory module, a first control bus which is shared by the first memory module and the second memory module, a second control bus for the first memory module and a third control bus for the second memory module; determining to perform a backup operation; electrically coupling the second control bus to the third control bus; controlling the first memory module by the second memory module to read data from one or more volatile memory devices of the first memory module, by using the first control bus and the third control bus which is electrically coupled to the second control bus; transferring the data read from the one or more volatile memory devices of the first memory module, to the second memory module through the data bus; and writing the data transferred through the data bus, in one or more nonvolatile memory devices of the second memory module.

The operating method may further include electrically decoupling the second control bus and the third control bus after the backup operation.

The method may further include determining to perform a recovery operation; electrically coupling the second control bus to the third control bus; reading data from the one or more nonvolatile memory devices of the second memory module; transferring the data read from the one or more nonvolatile memory devices of the second memory module, to the first memory module through the data bus; and controlling the first memory module by the second memory module to write the data transferred to the first memory module, in the one or more volatile memory devices of the first memory module, by using the first control bus and the third control bus which is electrically coupled to the second control bus.

The determining to perform the backup operation may be performed by an instruction from the memory controller or a power failure of a host.

In an embodiment, a memory system may include: a memory controller; a first memory module including one or more volatile memory devices; a second memory module including one or more nonvolatile memory devices; a data bus and a first control bus shared by the first and second memory modules and the memory controller; a second control bus dedicated for the first memory module and the memory controller; a third control bus dedicated for the second memory module and the memory controller; and a switch array suitable for electrically coupling the second control bus to the third control bus during a backup operation for backing up data of the one or more volatile memory devices to the one or more nonvolatile memory devices, and a recovery operation for recovering the data backed up in the one or more nonvolatile memory devices to the one or more volatile memory devices.

The memory system may further include: a system management bus (SMB) suitable for transferring information on the first and second memory modules to the memory controller, wherein the memory controller instructs the backup operation or the recovery operation to be performed, through the SMB; and an emergency power source suitable for supplying power to the switch array, the first memory module and the second memory module in the backup operation.

The switch array may electrically decouple the second control bus from the third control bus after the backup operation or the recovery operation.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to more clearly illustrate the various elements of the embodiments. It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, b, and C.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Figure 1:
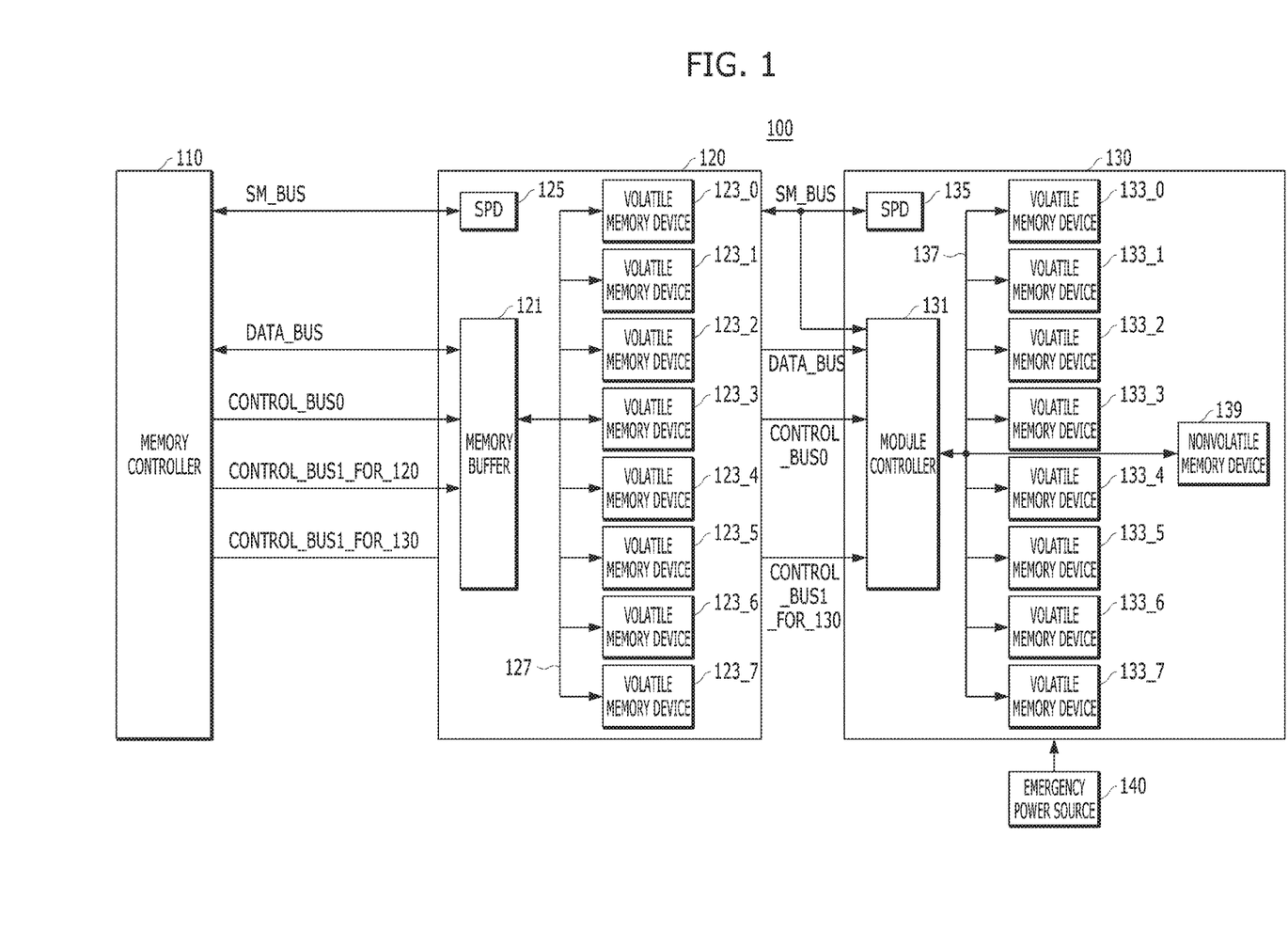
FIG. 1 is a configuration diagram illustrating a memory system in accordance with an embodiment of the present invention.

FIG. 1 is a configuration diagram illustrating a memory system 100 in accordance with an embodiment of the present invention.

Referring to FIG. 1, the memory system 100 may include a memory controller 110, a first memory module 120, a second memory module 130, a data bus DATA_BUS, a first control bus CONTROL_BUS0, a second control bus CONTROL_BUS1_FOR_120, a third control bus CONTROL_BUS1_FOR_130, a system management bus SM_BUS, and an emergency power source 140.

The memory controller 110 may control various operations, such as read and write operations of the first and second memory modules 120 and 130. The memory controller 110 may control the first memory module 120 by using the first control bus CONTROL_BUS0 and the second control bus CONTROL_BUS1_FOR_120. Also, the memory controller 110 may control the second memory module 130 by using the first control bus CONTROL_BUS0 and the third control bus CONTROL_BUS1_FOR_130. The memory controller 110 may transmit and receive data to and from the first memory module 120 and the second memory module 130 by using the data bus DATA_BUS. Further, the memory controller 110 may receive information on the first and second memory modules 120 and 130 through the system management bus SM_BUS.

The first control bus CONTROL_BUS0 may be shared by the first memory module 120 and the second memory module 130, and may transfer common control signals for controlling the first memory module 120 and the second memory module 130 to the first memory module 120 and the second memory module 130 from the memory controller 110. For example, through the first control bus CONTROL_BUS0, an active signal (ACT), a column address strobe signal (CAS), a row address strobe signal (RAS) and address signals may be transferred to the first and second memory modules 120 and 130.

The second control bus CONTROL_BUS1_FOR_120 may be used to control the first memory module 120, and transfer dedicated control signals for independently controlling the first memory module 120. For example, through the second control bus CONTROL_BUS1_FOR_120, a first chip select signal (CS1), a first clock enable signal (CKE1), a first on-die termination signal (ODT1) and a first clock signal (CK1) may be transferred. Here, the term 'first' may indicate signals for the first memory module 120.

The third control bus CONTROL_BUS1_FOR_130 may be used to control the second memory module 130, and transfer dedicated control signals for independently controlling the second memory module 130. For example, through the third control bus CONTROL_BUS1_FOR_130, a second chip select signal (CS2), a second clock enable signal (CKE2), a second on-die termination signal (ODT2) and a second clock signal (CK2) may be transferred. Here, the term 'second' may indicate signals for the second memory module 130.

The data bus DATA_BUS may include a plurality of data transmission lines for data transmission and a plurality of data strobe signal transmission lines which transfer data strobe signals for strobing data transferred through the plurality of data transmission lines.

The first memory module 120 may include a memory buffer 121, volatile memory devices 123_0 to 123_7, and a serial presence detector (SPD) 125. The memory buffer 121 may buffer control signals received through the first control bus CONTROL_BUS0 and the second control bus CONTROL_BUS1_FOR_120, and transfer the control signals to the volatile memory devices 123_0 to 123_7. In a write operation, the memory buffer 121 may buffer data received through the data bus DATA_BUS, and transfer the data to the volatile memory devices 123_0 to 123_7. In a read operation, the memory buffer 121 may transmit data read from the volatile memory devices 123_0 to 123_7, to the data bus DATA_BUS. An internal bus 127 may be used to transfer control signals and data between the memory buffer 121 and the volatile memory devices 123_0 to 123_7. The SPD 125 may store information on the first memory module 120, for example, information on the kinds, numbers and capacities of the memory devices 123_0 to 123_7 disposed in the first memory module 120. The SPD 125 may transfer the information on the first memory module 120 to the memory controller 110 through the system management bus SM_BUS. Each of the volatile memory devices 123_0 to 123_7 included in the first memory module 120 may be a DRAM. The first memory module 120 may be a DIMM (dual in-line memory module (DIMM) type.

The second memory module 130 may include a module controller 131, volatile memory devices 133_0 to 133_7, an SPD 135, and a nonvolatile memory device 139.

The module controller 131 may buffer control signals received through the first control bus CONTROL_BUS0 and the third control bus CONTROL_BUS1_FOR_130, and transfer the control signals to the volatile memory devices 133_0 to 133_7. In a write operation, the module controller 131 may buffer data received through the data bus DATA_BUS, and transfer the data to the volatile memory devices 133_0 to 133_7. In a read operation, the module controller 131 may transmit data read from the volatile memory devices 133_0 to 133_7, to the data bus DATA_BUS. An internal bus 137 may be used to transfer control signals and data between the module controller 131 and the volatile memory devices 133_0 to 133_7 and the nonvolatile memory device 139. The SPD 135 may store Information on the second memory module 130, for example, information on the kinds, numbers and capacities of the memory devices 133_0 to 133_7 and 139 disposed in the second memory module 130. The SPD 135 may transfer the information on the second memory module 130 to the memory controller 110 through the system management bus SM_BUS.

The module controller 131 may perform a backup operation and a recovery operation by controlling the volatile memory devices 133_0 to 133_7 and the nonvolatile memory device 139. In the backup operation, the module controller 131 may read the data of the volatile memory devices 133_0 to 133_7, and write the data in the nonvolatile memory device 139. The data backed up in the nonvolatile memory device 139 may be retained without being lost even though the power of the memory system 100 is cut off. In the recovery operation, the module controller 131 may read the data stored in the nonvolatile memory device 139, and write the data in the volatile memory devices 133_0 to 133_7. The backed-up data may be recovered as they are, by the recovery operation.

The backup operation may be started by an instruction from the memory controller 110. The memory controller 110 may instruct the backup operation to be performed to the module controller 131 through the system management bus SM_BUS.

The backup operation may be started by a power failure of a host. For example, when a power failure of the host occurs, the module controller 131 may back up the data which are stored in the volatile memory devices 133_0 to 133_7, in the nonvolatile memory device 139, so as to prevent the loss of the data. When performing the backup operation due to the power failure of the host, the emergency power source 140 may be used to supply adequate power to the second memory module 130 for performing the backup operation. Any suitable emergency power source 140 may be used. For example, the emergency power source may include a super capacitor.

Normally, when the power of the host is on, all components of the memory system 100 may operate normally by the power supplied by the host power source.

The recovery operation may be started by an instruction from the memory controller 110. The memory controller 110 may instruct the module controller 131 to perform the recovery operation through the system management bus SM_BUS. In the case where the backup operation is started by a power failure of the host, the recovery operation may be performed when the power of the host has been recovered.

In an embodiment, each of the volatile memory devices 133_0 to 133_7 included in the second memory module 130 may be a DRAM. The nonvolatile memory device 139 may be any suitable nonvolatile memory including, for example, a NAND flash memory and a phase-change random access memory (PCRAM). While one nonvolatile memory device 139 is illustrated in FIG. 1, it is to be noted that a plurality of nonvolatile memory devices 139 may be used. The nonvolatile memory device 139 may have a capacity sufficient to back up all the data of the volatile memory devices 133_0 to 133_7. The second memory module 130 may be a DIMM type, and be an NVDIMM since it is possible to retain data through the backup and recovery operations using the nonvolatile memory device 139 even in the case where power is cut off.

Figure 2:
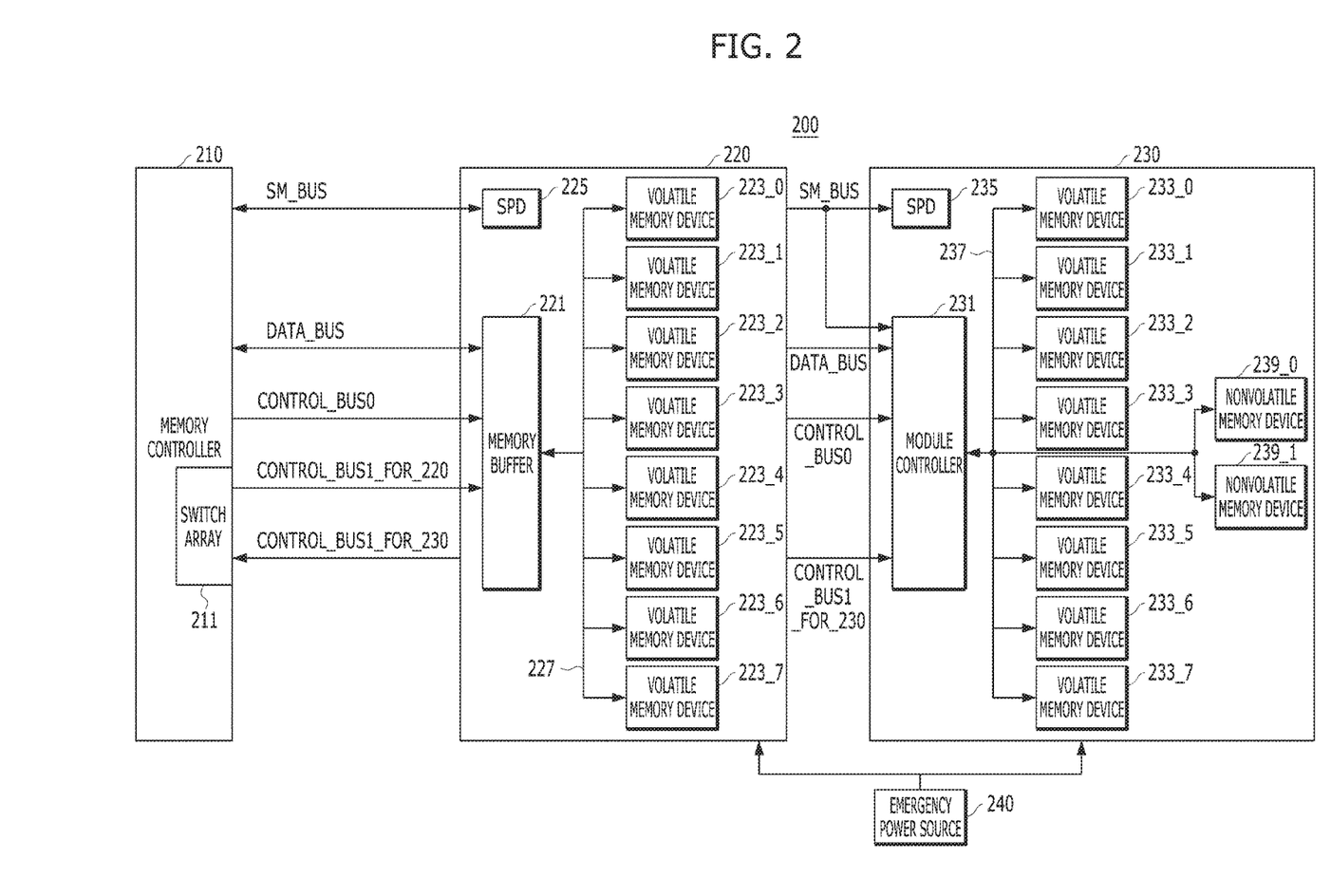
FIG. 2 is a configuration diagram Illustrating a memory system in accordance with an embodiment of the present invention.

In the memory system 100, because backup and recovery functions are implemented by using the nonvolatile memory device 139 in the second memory module 130, it is possible to prevent the loss of data stored in the second memory module 130. However, since the first memory module 120 does not support backup and recovery functions, data stored in the first memory module 120 may be lost. Loss of all data stored in the memory system 100 may be prevented by configuring all memory modules in the memory system 100 as NVDIMMs like the second memory module 130, however, the cost of such memory system will be substantially higher than the memory system 100 of FIG. 1. FIG. 2 is a configuration diagram illustrating a memory system 200 in accordance with another embodiment of the present invention.

Referring to FIG. 2, the memory system 200 may include a memory controller 210, a first memory module 220, a second memory module 230, a data bus DATA_BUS, a first control bus CONTROL_BUS0, a second control bus CONTROL_BUS1_FOR_220, a third control bus CONTROL_BUS1_FOR_230, a system management bus SM_BUS, and an emergency power source 240.

The memory controller 210 may control various operations, such as read and write operations of the first and second memory modules 220 and 230. The memory controller 210 may control the first memory module 220 by using the first control bus CONTROL_BUS0 and the second control bus CONTROL_BUS1_FOR_220, and control the second memory module 230 by using the first control bus CONTROL_BUS0 and the third control bus CONTROL_BUS1_FOR_230. The memory controller 210 may transmit and receive data to and from the first memory module 220 and the second memory module 230 by using the data bus DATA_BUS. Further, the memory controller 210 may receive information on the first memory module 220 and the second memory module 230 through the system management bus SM_BUS. The memory controller 210 may include a switch array 211. The switch array 211 may electrically couple the second control bus CONTROL_BUS1_FOR_220 to the third control bus CONTROL_BUS1_FOR_230 in backup and recovery operations, such that a module controller 231 of the second memory module 230 may control the first memory module 220. In the backup and recovery operations, the second memory module 230 may transmit a request to the memory controller 210 through the system management bus SM_BUS to electrically couple the second control bus CONTROL_BUS1_FOR_220 to the third control bus CONTROL_BUS1_FOR_230, and the memory controller 210 may electrically couple the second control bus CONTROL_BUS1_FOR_220 to the third control bus CONTROL_BUS1_FOR_230 in response to the request.

The first control bus CONTROL_BUS0 may be shared by the first memory module 220 and the second memory module 230, and transfer common control signals for controlling the first memory module 220 and the second memory module 230 to the first memory module 220 and the second memory module 230 through the first control bus CONTROL_BUS0 from the memory controller 210. For example, through the first control bus CONTROL_BUS0, an active signal (ACT), a column address strobe signal (CAS), a row address strobe signal (RAS) and address signals may be transferred.

The second control bus CONTROL_BUS1_FOR_220 may be used to control the first memory module 220, and transfer dedicated control signals for independently controlling the first memory module 220. For example, through the second control bus CONTROL_BUS1_FOR_220, a first chip select signal (CS1), a first clock enable signal (CKE1), a first on-die termination signal (ODT1) and a first clock signal (CK1) may be transferred. Here, the term 'first' may indicate signals for the first memory module 220.

The third control bus CONTROL_BUS1_FOR_230 may be used to control the second memory module 230, and transfer dedicated control signals for Independently controlling the second memory module 230. For example, through the third control bus CONTROL_BUS1_FOR_230, a second chip select signal (CS2), a second clock enable signal (CKE2), a second on-die termination signal (ODT2) and a second clock signal (CK2) may be transferred. Here, the term 'second' may indicate signals for the second memory module 230.

The data bus DATA_BUS may include a plurality of data transmission lines for data transmission and a plurality of data strobe signal transmission lines which transfer data strobe signals for strobing data transferred through the plurality of data transmission lines.

The memory module 220 may include a memory buffer 221, volatile memory devices 223_0 to 223_7, and an SPD 225. The memory buffer 221 may buffer control signals received through the first control bus CONTROL_BUS0 and the second control bus CONTROL_BUS1_FOR_220, and transfer the control signals to the volatile memory devices 223_0 to 223_7. In a write operation, the memory buffer 221 may buffer data received through the data bus DATA_BUS, and transfer the data to the volatile memory devices 223_0 to 223_7. In a read operation, the memory buffer 221 may transmit data read from the volatile memory devices 223_0 to 223_7, to the data bus DATA_BUS. An internal bus 227 may be used to transfer control signals and data between the memory buffer 221 and the volatile memory devices 223_0 to 223_7. The SPD 225 may store information on the first memory module 220, for example, information on the kinds, numbers and capacities of the memory devices 223_0 to 223_7 disposed in the first memory module 220. The SPD 225 may transfer the information on the first memory module 220 to the memory controller 210 through the system management bus SM_BUS. In an embodiment, each of the volatile memory devices 223_0 to 223_7 included in the first memory module 220 may be a DRAM. The first memory module 220 may be a dual in-line memory module (DIMM) type. While the first memory module 220 cannot perform backup and recovery functions by itself, the backup and recovery functions for the data which are stored in the first memory module may be performed by the second memory module 230.

The second memory module 230 may include the module controller 231, volatile memory devices 233_0 to 233_7, an SPD 235, and nonvolatile memory devices 239_0 and 239_1.

The module controller 231 may buffer control signals received through the first control bus CONTROL_BUS0 and the third control bus CONTROL_BUS1_FOR_230, and transfer the control signals to the volatile memory devices 233_0 to 233_7. In a write operation, the module controller 231 may buffer data received through the data bus DATA_BUS, and transfer the data to the volatile memory devices 233_0 to 233_7. In a read operation, the module controller 231 may transmit data read from the volatile memory devices 233_0 to 233_7, to the data bus DATA_BUS. An internal bus 237 may be used to transfer control signals and data between the module controller 231 and the volatile memory devices 233_0 to 233_7 and the nonvolatile memory devices 239_0 and 239_1. The SPD 235 may store information on the second memory module 230, for example, information on the kinds, numbers and capacities of the memory devices 233_0 to 233_7 and 239_0 and 239_1 disposed in the second memory module 230. The SPD 235 may transfer the information on the second memory module 230 to the memory controller 210 through the system management bus SM_BUS.

The module controller 231 may perform the backup operation and the recovery operation by controlling the volatile memory devices 223_0 to 223_7 of the first memory module 220, and the volatile memory devices 233_0 to 233_7 and the nonvolatile memory devices 239_0 and 239_1 of the second memory module 230. In the backup and recovery operations, the module controller 231 may transmit a request to the memory controller 210 through the system management bus SM_BUS to electrically couple the second control bus CONTROL_BUS1_FOR_220 to the third control bus CONTROL_BUS1_FOR_230, and control the volatile memory devices 223_0 to 223_7 of the first memory module 220 by using the first control bus CONTROL_BUS0 and the third control bus CONTROL_BUS1_FOR_230 which is electrically coupled to the second control bus CONTROL_BUS1_FOR_220. In the backup operation, the module controller 231 may read the data of the volatile memory devices 223_0 to 223_7 and 233_0 to 233_7 of the first memory module 220 and the second memory module 230, respectively, and write the read data in the nonvolatile memory devices 239_0 and 239_1. In the backup operation, the data read from the volatile memory devices 223_0 to 223_7 of the first memory module 220 may be transferred to the second memory module 230 through the data bus DATA_BUS and may be written in the nonvolatile memory devices 239_0 and 239_1. The data backed up in the nonvolatile memory devices 239_0 and 239_1 may be retained without being lost even though the power of the memory system 200 is cut off. In the recovery operation, the module controller 231 may read the data stored in the nonvolatile memory devices 239_0 and 239_1, and write the read data in the volatile memory devices 223_0 to 223_7 and 233_0 to 233_7 of the first memory module 220 and the second memory module 230. The backed-up data may be recovered as they are, by the recovery operation.

The backup operation may be started by an instruction from the memory controller 210. The memory controller 210 may instruct the backup operation to be performed to the module controller 231 through the system management bus SM_BUS. Also, the backup operation may be started by a power failure of a host. For example, in the case of the power failure of the host, the module controller 231 may back up the data stored in the volatile memory devices 223_0 to 223_7 and 233_0 to 233_7, in the nonvolatile memory devices 239_0 and 239_1, so as to prevent loss of data. When performing the backup operation due to the power failure of the host, the emergency power source 240 may be used to perform the backup operation. The emergency power source 240 may supply power necessary for the backup operation, to the first memory module 220 and the second memory module 230. The emergency power source 240 may be any suitable power source and may, for example, include a super capacitor.

The recovery operation may be started by an instruction from the memory controller 210. The memory controller 210 may instruct the recovery operation to be performed to the module controller 231 through the system management bus SM_BUS. In the case where the backup operation is started by the power failure of the host, the recovery operation may be performed when the power of the host is recovered normally.

In an embodiment, each of the volatile memory devices 233_0 to 233_7 included in the second memory module 230 may be a DRAM. Each of the nonvolatile memory devices 239_0 and 239_1 may be any suitable nonvolatile memory including, for example, a NAND flash memory and a PCRAM. While it is illustrated in the drawing that the number of the nonvolatile memory devices 239_0 and 239_1 is 2, it is to be noted that a different number of nonvolatile memory devices may be used. The nonvolatile memory devices 239_0 and 239_1 may have capacities sufficient to back up all the data of the volatile memory devices 223_0 to 223_7 and 233_0 to 233_7. The second memory module 230 may be a DIMM type, and be an NVDIMM since it is possible to retain data through the backup and recovery operations using the nonvolatile memory devices 239_0 and 239_1 even in the case where power is cut off.

In the memory system 200 of FIG. 2, even though the only one memory module 230 of the two memory modules 220 and 230 includes the nonvolatile memory devices 239_0 and 239_1, it is possible to back up and recover all the data of the volatile memory devices 223_0 to 223_7 and 233_0 to 233_7 in the two memory modules 220 and 230.

Figure 3:
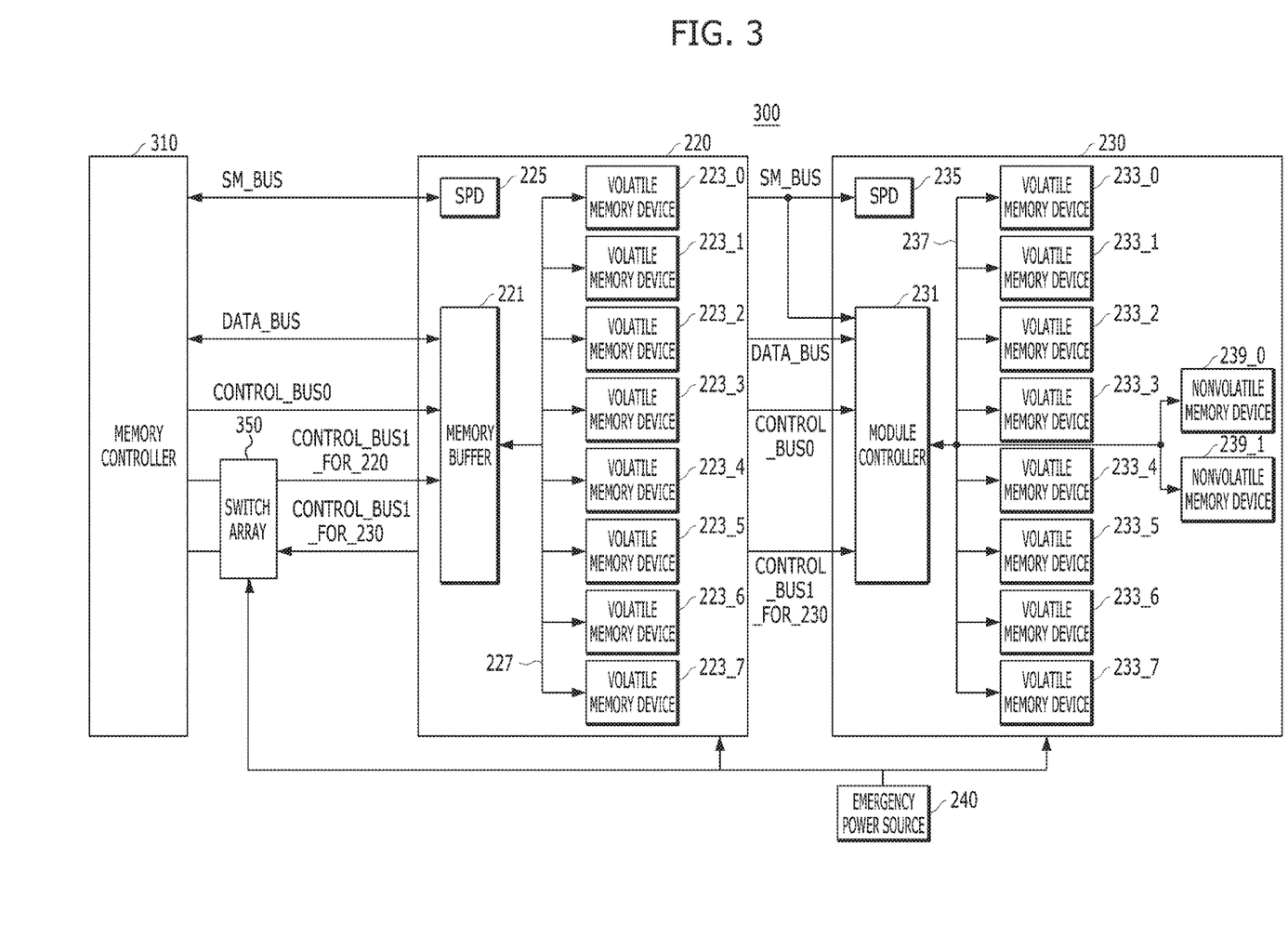
FIG. 3 is a configuration diagram illustrating a memory system in accordance with an embodiment of the present invention.

FIG. 3 is a configuration diagram illustrating a memory system 300 in accordance with still another embodiment of the present invention. In FIGS. 2 and 3, like reference numerals are used to refer to the same elements.

Referring to FIG. 3, the memory system 300 may include a memory controller 310, a first memory module 220, a second memory module 230, a data bus DATA_BUS, a first control bus CONTROL_BUS0, a second control bus CONTROL_BUS1_FOR_220, a third control bus CONTROL_BUS1_FOR_230, a system management bus SM_BUS, an emergency power source 240, and a switch array 350.

The memory system 300 of FIG. 3 has a difference in that the switch array 350 is positioned outside the memory controller 310 while the switch array 211 is disposed in the memory controller 210 in the memory system 200 of FIG. 2. The switch array 350 may operate by using the emergency power source 240 in the case of a power failure of a host, that is, in the case of a power failure of the host including the memory controller 310. As the switch array 350 is positioned outside the memory controller 310, the switch array 350 may operate stably in the case of a power failure of the host.

Figure 4:
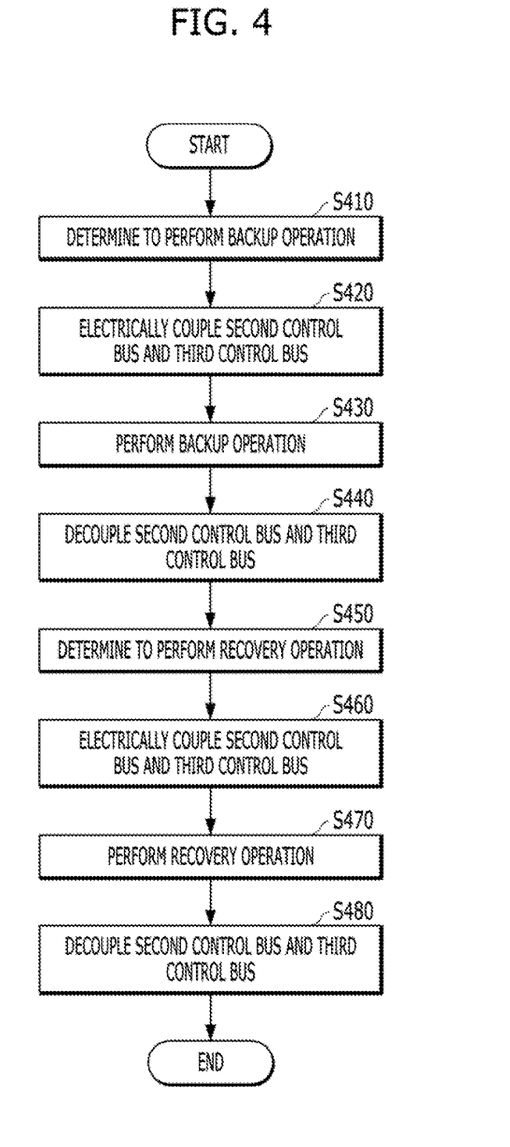
FIG. 4 is a flow chart explaining backup and recovery operations in the memory system shown in FIGS. 2 and 3.

FIG. 4 is a flow chart explaining backup and recovery operations in the memory system 200 or 300 shown in FIGS. 2 and 3.

Referring to FIG. 4, it may be determined to perform a backup operation at step S410. The determination to perform a backup operation may be implemented as the memory controller 210 or 310 instructs the backup operation to be performed to the module controller 231 of the second memory module 230 through the system management bus SM_BUS. Also, it may be determined, by a power failure of a host, to perform a backup operation.

In order to perform the backup operation, the second control bus CONTROL_BUS1_FOR_220 and the third control bus CONTROL_BUS1_FOR_230 may be electrically coupled, at step S420. This may be implemented as the module controller 231 transmits a request through the system management bus SM_BUS to electrically couple the second control bus CONTROL_BUS1_FOR_220 to the third control bus CONTROL_BUS1_FOR_230, and the switch array 311 or 350 electrically couples the second control bus CONTROL_BUS1_FOR_220 to the third control bus CONTROL_BUS1_FOR_230 in response to the request. While the second control bus CONTROL_BUS1_FOR_220 and the third control bus CONTROL_BUS1_FOR_230 are electrically coupled to each other, the second control bus CONTROL_BUS1_FOR_220 and the third control bus CONTROL_BUS1_FOR_230 may be electrically decoupled from the memory controller 210 or 310.

Then, by control of the module controller 231, the data of the volatile memory devices 223_0 to 223_7 of the first memory module 220 and the volatile memory devices 233_0 to 233_7 of the second memory module 230 may be backed up in the nonvolatile memory devices 239_0 and 239_1 of the second memory module 230, at step S430. In the backup operation, the module controller 231 may control the data to be read from the volatile memory devices 223_0 to 223_7 of the first memory module 220 by using the first control bus CONTROL_BUS0 and the third control bus CONTROL_BUS1_FOR_230 which is electrically coupled to the second control bus CONTROL_BUS1_FOR_220, and the data read from the volatile memory devices 223_0 to 223_7 may be transferred to the second memory module 230 through the data bus DATA_BUS.

When the backup operation is completed, the second control bus CONTROL_BUS1_FOR_220 and the third control bus CONTROL_BUS1_FOR_230 may be electrically decoupled from each other, at step S440.

Then, it may be determined to perform a recovery operation at step S450. The determination to perform a recovery operation may be implemented as the memory controller 210 or 310 instructs the recovery operation to be performed to the module controller 231 of the second memory module 230 through the system management bus SM_BUS. Also, it may be determined to perform a recovery operation, as power is recovered to a normal status after the power failure of the host.

In order to perform the recovery operation, the second control bus CONTROL_BUS1_FOR_220 and the third control bus CONTROL_BUS1_FOR_230 may be electrically coupled, at step S460. This may be implemented as the module controller 231 transmits a request through the system management bus SM_BUS to electrically couple the second control bus CONTROL_BUS1_FOR_220 to the third control bus CONTROL_BUS1_FOR_230, and the switch array 311 or 350 electrically couples the second control bus CONTROL_BUS1_FOR_220 to the third control bus CONTROL_BUS1_FOR_230 in response to the request. While the second control bus CONTROL_BUS1_FOR_220 and the third control bus CONTROL_BUS1_FOR_230 are electrically coupled to each other, the second control bus CONTROL_BUS1_FOR_220 and the third control bus CONTROL_BUS1_FOR_230 may be electrically decoupled from the memory controller 210 or 310.

Then, by control of the module controller 231, the data of the nonvolatile memory devices 239_0 and 239_1 of the second memory module 230 may be recovered to the volatile memory devices 223_0 to 223_7 of the first memory module 220 and the volatile memory devices 233_0 to 233_7 of the second memory module 230, at step S470. In the recovery operation, data to be recovered to the volatile memory devices 223_0 to 223_7 of the first memory module 220 among the data stored in the nonvolatile memory devices 239_0 and 239_1 may be transferred to the first memory module 220 through the data bus DATA_BUS. Moreover, the module controller 231 may control the data to be written in the volatile memory devices 223_0 to 223_7 of the first memory module 220, by using the first control bus CONTROL_BUS0 and the third control bus CONTROL_BUS1_FOR_230 which is electrically coupled to the second control bus CONTROL_BUS1_FOR_220.

When the recovery operation is completed, the second control bus CONTROL_BUS1_FOR_220 and the third control bus CONTROL_BUS1_FOR_230 may be electrically decoupled from each other, at step S480.

As is apparent from the above descriptions, according to the described embodiments, it is possible to back up and recover data between different memory modules of a memory system.

Although various embodiments have been described for illustrative purposes, it will be apparent to those skilled in the art that various other changes and modifications may be made without departing from the spirit and scope of the invention as defined in the following claims.

For example, in an embodiment, the non-volatile memory devices 239_0 and 239_1 may each be dedicated to storing back-up data of only one of the first and second memory modules.

What is claimed is:

1. A memory system comprising:
   a memory controller;
   a first memory module suitable for operating under control of the memory controller, the first memory module including one or more first volatile memory devices;
   a second memory module suitable for operating under control of the memory controller, the second memory module including one or more nonvolatile memory devices;
   a data bus electrically coupled to the memory controller, the first memory module and the second memory module;
   a first control bus electrically coupled to the memory controller, the first memory module and the second memory module and suitable for transmitting first control signals from the memory controller to the first memory module and the second memory module;
   a second control bus electrically coupled to the memory controller and the first memory module and suitable for transmitting second control signals from the memory controller to the first memory module; and
   a third control bus electrically coupled to the memory controller and the second memory module and suitable for transmitting third control signals from the memory controller to the second memory module,
   wherein, in a backup operation for backing up data of the one or more first volatile memory devices to the one or more nonvolatile memory devices, the second control bus and the third control bus are electrically coupled and the first memory module operates under control of the second memory module through the first control bus and the third control bus.

2. The memory system according to claim 1, wherein, in a recovery operation for recovering the data backed up in the one or more nonvolatile memory devices to the one or more first volatile memory devices, the second control bus and the third control bus are electrically coupled.

3. The memory system according to claim 2, wherein, in the backup operation and the recovery operation, the memory controller electrically couples the second control bus to the third control bus.

4. The memory system according to claim 3, wherein, in the backup operation and the recovery operation, the second memory module transmits a request to electrically couple the second control bus to the third control bus, to the memory controller through a system management bus (SMB).

5. The memory system according to claim 1,
   wherein the second memory module further includes a module controller, and
   wherein, in the backup operation, the module controller controls the first memory module such that data are read from the one or more first volatile memory devices, and controls the second memory module such that the read data are written in the one or more nonvolatile memory devices.

6. The memory system according to claim 5,
   wherein, in the backup operation, the module controller controls the first memory module by using the first control bus and the third control bus which is electrically coupled to the second control bus, and
   wherein, in the backup operation, data read from the first memory module are transferred to the second memory module through the data bus.

7. The memory system according to claim 1,
   wherein the second memory module further includes one or more second volatile memory devices, and
   wherein, in the backup operation, data of the one or more second volatile memory devices are backed up to the one or more nonvolatile memory devices.

8. The memory system according to claim 1, wherein the first control signals include an active signal, a column address strobe signal, a row address strobe signal and address signals for the first memory module and the second memory module.

9. The memory system according to claim 8, wherein the second control signals include a chip select signal, a clock enable signal, an on-die termination signal and a clock signal for the first memory module.

10. The memory system according to claim 9, wherein the third control signals include a chip select signal, a clock enable signal, an on-die termination signal and a clock signal for the second memory module.

11. The memory system according to claim 1, further comprising:
    a switch array suitable for electrically coupling the second control bus to the third control bus in the backup operation.

12. The memory system according to claim 11, wherein the switch array electrically decouples the second control bus and the third control bus from the memory controller when electrically coupling the second control bus to the third control bus.

13. The memory system according to claim 1, further comprising:
    an emergency power source suitable for supplying power to the first memory module and the second memory module in the backup operation by a power failure of a host.

14. An operating method of a memory system, comprising:
    providing the memory system including a memory controller, a first memory module, a second memory module, a data bus which is shared by the first memory module and the second memory module, a first control bus which is shared by the first memory module and the second memory module, a second control bus for the first memory module and a third control bus for the second memory module;
    determining to perform a backup operation;
    electrically coupling the second control bus to the third control bus;
    controlling the first memory module by the second memory module to read data from one or more volatile memory devices of the first memory module, by using the first control bus and the third control bus which is electrically coupled to the second control bus;
    transferring the data read from the one or more volatile memory devices of the first memory module, to the second memory module through the data bus; and
    writing the data transferred through the data bus, in one or more nonvolatile memory devices of the second memory module.

15. The operating method according to claim 14, further comprising:
    electrically decoupling the second control bus from the third control bus after the backup operation.

16. The operating method according to claim 15, further comprising:
  determining to perform a recovery operation;
  electrically coupling the second control bus to the third control bus;
  reading data from the one or more nonvolatile memory devices of the second memory module;
  transferring the data read from the one or more nonvolatile memory devices of the second memory module, to the first memory module through the data bus; and
  controlling the first memory module by the second memory module to write the data transferred to the first memory module, in the one or more volatile memory devices of the first memory module, by using the first control bus and the third control bus which is electrically coupled to the second control bus.

17. The operating method according to claim 14, wherein the determining to perform the backup operation is performed by an instruction from the memory controller or a power failure of a host.

18. A memory system comprising:
  a memory controller;
  a first memory module including one or more volatile memory devices;
  a second memory module including one or more nonvolatile memory devices;
  a data bus and a first control bus shared by the first and second memory modules and the memory controller;
  a second control bus dedicated for the first memory module and the memory controller;
  a third control bus dedicated for the second memory module and the memory controller; and
  a switch array suitable for electrically coupling the second control bus to the third control bus during a backup operation for backing up data of the one or more volatile memory devices to the one or more nonvolatile memory devices, and a recovery operation for recovering the data backed up in the one or more nonvolatile memory devices to the one or more volatile memory devices,
  wherein during the backup operation and the recovery operation, the first memory module operates under control of the second memory module through the first control bus and the third control bus.

19. The memory system according to claim 18, further comprising:
  a system management bus (SMB) suitable for transferring information on the first and second memory modules to the memory controller, wherein the memory controller instructs the backup operation or the recovery operation to be performed, through the SMB; and
  an emergency power source suitable for supplying power to the switch array, the first memory module and the second memory module in the backup operation.

20. The memory system according to claim 18, wherein the switch array electrically decouples the second control bus from the third control bus after the backup operation or the recovery operation.

* * * * *